(12) United States Patent
Kleen et al.

(10) Patent No.: US 12,078,980 B2
(45) Date of Patent: Sep. 3, 2024

(54) SYSTEM, VERIFICATION MODULE, SERVICE MODULE, AND METHOD FOR SUPPORTING A REMOTE CERTIFICATION SERVICE BASED ON BLOCKCHAIN

(71) Applicant: Fraunhofer-Gesellschaft zur Förderung der angewandten Forschung e.V., Munich (DE)

(72) Inventors: Philip Kleen, Karlsruhe (DE); Sebastian Schriegel, Karlsruhe (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 606 days.

(21) Appl. No.: 17/308,411

(22) Filed: May 5, 2021

(65) Prior Publication Data

US 2021/0255608 A1    Aug. 19, 2021

Related U.S. Application Data

(63) Continuation of application No. PCT/EP2019/080439, filed on Nov. 6, 2019.

(30) Foreign Application Priority Data

Nov. 9, 2018  (DE) .......................... 102018219188.3

(51) Int. Cl.
*H04L 9/32*         (2006.01)
*G05B 19/418*     (2006.01)
(Continued)

(52) U.S. Cl.
CPC ... *G05B 19/41845* (2013.01); *G05B 19/4183* (2013.01); *G05B 19/4186* (2013.01);
(Continued)

(58) Field of Classification Search
CPC ....... H04L 9/3236; H04L 9/3263; H04L 9/50; G05B 19/41845; G05B 19/4183; G05B 19/4186; G05B 23/0213
See application file for complete search history.

(56) References Cited

U.S. PATENT DOCUMENTS 11,038,771 B2 *   6/2021   Padmanabhan ....... H04L 9/3239
11,140,201 B2 * 10/2021   Singh ...................... G06F 21/64
(Continued)

FOREIGN PATENT DOCUMENTS

CN    107508812 A    12/2017
CN    107730277 A     2/2018
(Continued)

OTHER PUBLICATIONS

Anonymous, "Blockchain: the solution for transparency in product supply chains", (Nov. 21, 2015), URL: www.prvenance.org/whitepaper, (Jul. 19, 2017), XP055392270 [A], p. 4-30, p. 37-39, 2015.
(Continued)

*Primary Examiner* — Hosuk Song
(74) *Attorney, Agent, or Firm* — Perkins Coie LLP; Michael A. Glenn

(57) ABSTRACT

A system is provided which includes at least two production units, which interact in a production process, and a verification module. Each production unit of the at least two production units includes a service module and is configured to transmit first information about one or more features of the production unit to the verification module. The verification module is configured to transmit, to at least one of the at least two production units, second information designating whether the at least two production units exhibit an admissible configuration or whether the at least two production units exhibit no admissible configuration.

40 Claims, 5 Drawing Sheets

(51) Int. Cl.
*G05B 23/02* (2006.01)
*H04L 9/00* (2022.01)

(52) U.S. Cl.
CPC ........ *G05B 23/0213* (2013.01); *H04L 9/3236* (2013.01); *H04L 9/3263* (2013.01); *H04L 9/50* (2022.05)

(56) References Cited

U.S. PATENT DOCUMENTS

| | | | |
|---|---|---|---|
| 11,469,886 B2 * | 10/2022 | Padmanabhan | G06F 21/64 |
| 11,494,836 B2 * | 11/2022 | Cella | H04L 9/50 |
| 11,528,147 B2 * | 12/2022 | Madisetti | H04L 9/50 |
| 2008/0154409 A1 | 6/2008 | Srikumar et al. | |
| 2019/0190720 A1 | 6/2019 | Falk | |
| 2019/0280872 A1 | 9/2019 | Falk | |

FOREIGN PATENT DOCUMENTS

| | | |
|---|---|---|
| CN | 107945021 A | 4/2018 |
| CN | 108540507 A | 9/2018 |
| DE | 60103910 T2 | 7/2004 |
| DE | 60212577 T2 | 8/2006 |
| DE | 102016215914 A1 | 3/2018 |
| DE | 102016215915 A1 | 3/2018 |
| EP | 1364508 B1 | 6/2006 |
| EP | 3355230 A1 | 8/2018 |
| WO | 0219609 A2 | 3/2002 |
| WO | 2017194976 A1 | 11/2017 |
| WO | 2018059850 A1 | 4/2018 |
| WO | 2018137856 A1 | 8/2018 |

OTHER PUBLICATIONS

Schriegel, Sebastian; Niggemann, Oliver, Otto, Jens; Dürkop, Lars; Henning, Steffen: Selbstkonfiguration in der Automation. In: VDI-Tagung Multisensorik in der Fertigungsmesstechnik 2015 Nürtingen, Mar. 2015, 2015.

W Prinz et al.: Blockchain—Technologien, Forschungsfragen und Anwendungen, Mar. 20, 2017 (Mar. 20, 2017), pp. 1-39, XP055665691, URL:https://www.aisec.fraunhofer.de/content/dam/aisec/Dokumente/Publikationen/Studie, 2017.

Acatech-Studie „Wandlungsfähige, menschzentrierte Strukturen in Fabriken und Netzwerken der Industrie 4.0, Feb. 2018, München, 2018.

Philip Kleen, Janis Albrecht et al., Funktionale Sicherheit von autonomen Transportsystemen in flexiblen I4.0 Fertigungsumgebungen, Sep. 2018, 2018.

BMBF-Spitzencluster it's OWL, now available under https://www.its-owl.de/home/.

DIN EN ISO 13849-1. Sicherheit von Maschinen—Sicherheitsbezogene Teile von Steuerungen.

DIN ISO 13849-2. Sicherheit von Maschinen—Sicherheitsbezogene Teile von Steuerungen.

DIN ISO 13849-A1. Sicherheit von Maschinen—Sicherheitsbezogene Teile von Steuerungen.

DIN SPEC 91345: Reference Architecture Model Industrie 4.0 (RAMI4.0), DIN, Apr. 2016.

IEC 62061. Sicherheit von Maschinen—Funktionale Sicherheit sicherheitsbezogener elektrischer, elektronischer und programmierbarer elektronischer Steuerungssysteme.

NAMUR NE153. Automation Security 2020—Anforderungen an Design, Implementierung und Betrieb künftiger industrieller Automatisierungssysteme 2020.

Flatt, Holger, et al., "Analysis of the Cyber-Security of Industry 4.0 Technologies based on RAMI 4.0 and Identification of Requirements", 21st IEEE International Conference on Emerging Technologies and Factory Automation (ETFA 2016) Berlin, Sep. 2016.

Schriegel, Sebastian, et al., "Anforderungen an Datenschutz und Datensicherheit von Smart Grid-Technologien", e&i Elektrotechnik und Informationstechnik: Gebäudeautomation und Smart City, Wien, Apr. 2012.

Schriegel, Sebastian, et al., "Intelligente Lastverschiebung in der Produktionstechnik—Ein Weg zum Industrial Smart Grid", VDE-Kongress Smart Grid 2012—Intelligente Energieversorgung der Zukunft, (Intelligent Demand Side Management within Production Systems—Towards Industrial Smart Grids) Stuttgart, Nov. 2012.

* cited by examiner

SYSTEM, VERIFICATION MODULE, SERVICE MODULE, AND METHOD FOR SUPPORTING A REMOTE CERTIFICATION SERVICE BASED ON BLOCKCHAIN

CROSS-REFERENCES TO RELATED APPLICATIONS

This application is a continuation of copending International Application No. PCT/EP2019/080439, filed Nov. 6, 2019, which is incorporated herein by reference in its entirety, and additionally claims priority from German Application No. DE 102018219188.3, filed Nov. 9, 2018, which is incorporated herein by reference in its entirety.

The application refers to remote certification and, in particular, to a system, a verification module (checking module), a service module, and a method of supporting a remote certification service based on blockchain.

Certification services of an infrastructure of production units, e.g. of machines in a factory, are increasingly gaining importance.

BACKGROUND OF THE INVENTION

For example, it is with increasing frequency that production units are reconfigured, driven by the demands made by Industry 4.0. Modification and/or reconfiguration of the technical process, or utilization of the production unit within a different context ask for renewed verification of machine safety. Said verification nowadays is performed on site by experts. Travelling times of the experts render the process costly and undynamic.

It would therefore be desirable if improved certification concepts for production units were provided.

SUMMARY

According to an embodiment, a system may have: at least two production units, which interact in a production process, and a verification module, wherein each production unit of the at least two production units includes a service module, wherein the service module of each production unit of the at least two production units is configured to transmit first information about one or more features of the production unit to the verification module, wherein the verification module is configured to transmit, to the service module of at least one of the at least two production units, second information designating whether the at least two production units exhibit an admissible configuration or whether the at least two production units exhibit no admissible configuration.

According to an embodiment, a method may have the steps of: transmitting first information by a service module of each production unit of at least two production units to a verification module, said first information transmitted by the service module of the production unit being information about one or more features of the production unit, and transmitting second information to the service module of at least one of the at least two production units by the verification module, said second information designating whether the at least two production units exhibit an admissible configuration or whether the at least two production units exhibit no admissible configuration.

Another embodiment may have a verification module being configured to gather first information from a service module of each production unit of at least two production units, said first information gathered by the verification module from the service module of each production unit of the at least two production units being information about one or more features of the production unit, said verification module being configured to transmit, to the service module of at least one of the at least two production units, second information designating whether the at least two production units exhibit an admissible configuration or whether the at least two production units exhibit no admissible configuration.

According to yet another embodiment, a method may have the steps of: receiving, on the part of a verification module, first information from a service module of each production unit of at least two production units, said first information transmitted by the service module of the production unit being information about one or more features of the production unit, and transmitting second information to the service module of at least one of the at least two production units by the verification module, said second information designating whether the at least two production units exhibit an admissible configuration or whether the at least two production units exhibit no admissible configuration.

Another embodiment may have a service module for a production unit of at least two production units, the service module being configured to transmit first information about one or more features of the production unit of the service module to the verification module, the service module being configured to receive, from a verification module, second information designating whether the at least two production units exhibit an admissible configuration or whether the at least two production units exhibit no admissible configuration.

Another embodiment may have a production unit which may have the service module for a production unit of at least two production units, the service module being configured to transmit first information about one or more features of the production unit of the service module to the verification module, the service module being configured to receive, from a verification module, second information designating whether the at least two production units exhibit an admissible configuration or whether the at least two production units exhibit no admissible configuration.

According to yet another embodiment, a method may have the steps of: transmitting first information to a verification module by a service module of a production unit of at least two production units, said first information transmitted by the service module of the production unit being information about one or more features of the production unit of the service module, and receiving second information from the verification module on the part of the service module, said second information designating whether the at least two production units exhibit an admissible configuration or whether the at least two production units exhibit no admissible configuration.

According to yet another embodiment, computer programs may have program codes for performing the inventive methods, when the computer program is executed on a computer or signal processor.

A system is provided. The system includes at least two production units, which interact in a production process, and a verification module. Each production unit of the at least two production units includes a service module. The service module of each production unit of the at least two production units is configured to transmit first information about one or more features of the production unit to the verification module. The verification module is configured to transmit, to the service module of at least one of the at least two production units, second information designating whether the at least two production units exhibit an admissible configuration, or whether the at least two production units exhibit no admissible configuration.

In addition, a method is provided which includes:
transmitting first information by a service module of each production unit of at least two production units to a verification module, said first information transmitted by the service module of the production unit being information about one or more features of the production unit. And:
transmitting second information to the service module of at least one of the at least two production units by the verification module, said second information designating whether the at least two production units exhibit an admissible configuration or whether the at least two production units exhibit no admissible configuration.

Moreover, a verification module is provided. The verification module is configured to obtain first information from a service module of each production unit of at least two production units; the first information, which is obtained by the verification module from the service module of each production unit of the at least two production units, is information about one or more features of the production unit. Moreover, the verification module is configured to transmit, to the service module of at least one of the at least two production units, second information designating whether the at least two production units exhibit an admissible configuration, or whether the at least two production units exhibit no admissible configuration.

Moreover, a method is provided which includes:
receiving, on the part of a verification module, first information from a service module of each production unit of at least two production units, said first information transmitted by the service module of the production unit being information about one or more features of the production unit. And:
transmitting second information to the service module of at least one of the at least two production units by the verification module, said second information designating whether the at least two production units exhibit an admissible configuration or whether the at least two production units exhibit no admissible configuration.

In addition, a service module for a production unit of at least two production units is provided. The service module is configured to transmit first information about one or more features of the production unit of the service module to the verification module. Furthermore, the service module is configured to receive, from a verification module, second information designating whether the at least two production units exhibit an admissible configuration or whether the at least two production units exhibit no admissible configuration.

Moreover, a method is provided which includes:
transmitting first information to a verification module by a service module of a production unit of at least two production units, said first information transmitted by the production unit being information about one or more features of the production unit of the service module. And:
receiving second information from the verification module on the part of the service module, said second information designating whether the at least two production units exhibit an admissible configuration or whether the at least two production units exhibit no admissible configuration.

In addition, computer programs comprising program codes for performing the above-described methods are provided when the respective computer program is executed on a computer or signal processor.

Embodiments of the invention implement a remote certification service, i.e. on blockchain, which enables safety testing and clearance of a safety-critical process via the internet. Within this context, adherence to/compliance with machine safety within the context of the Machinery Directive, as well as other pertinent norms and laws, are checked from a distance (remote-checked) in an automated manner. This may be effected, e.g., by means of remote risk assessment in some embodiments.

In embodiments, said manual procedure is automated (or at least partly automated), and is dynamized in terms of behavior by means of the remote certification service. For example, one starts by utilizing safety-relevant information that is provided, continues with analyzing while using a verification algorithm, and ends by certifying the modification. Said process is documented and invoiced, e.g. in an automatic and reliable, e.g. legally secure, manner, via suitable blockchain technology in embodiments.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
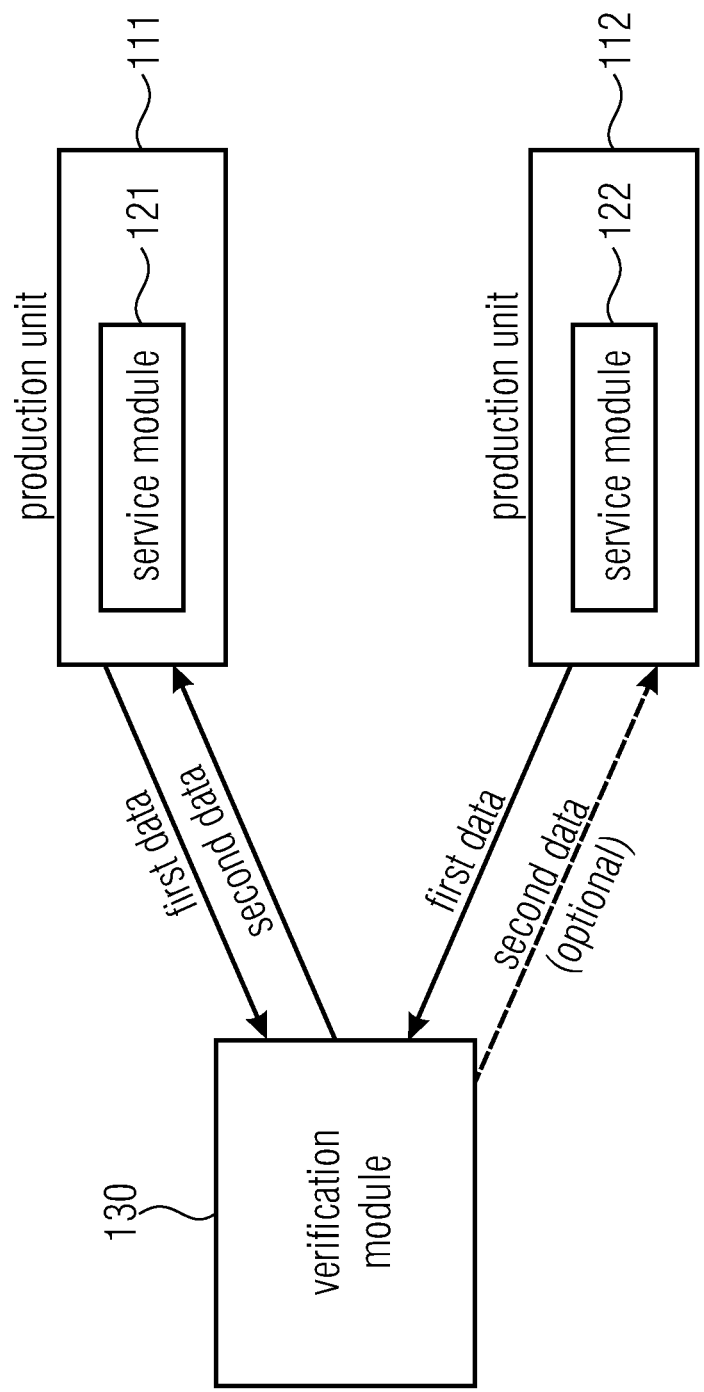
FIG. 1 shows a system in accordance with an embodiment.

FIG. 1 shows a system in accordance with an embodiment. The system includes at least two production units 111, 112, which interact in a production process, and a verification module 130. Each production unit of the at least two production units 111, 112 includes a service module 121, 122.

The service module 121, 122 of each production unit of the at least two production units 111, 112 is configured to transmit first information about one or more features of the production unit to the verification module 130.

The verification module 130 is configured to transmit, to the service module 121, 122 of at least one of the at least two production units 111, 112, second information designating whether the at least two production units 111, 112 exhibit an admissible configuration or whether the at least two production units 111, 112 exhibit no admissible configuration.

In accordance with an embodiment, the verification module 130 may comprise, e.g., a test algorithm which determines, as a function of the first information about the one or more features that is transmitted to the verification module 130 by the service module 121, 122 of the at least two production units, whether the at least two production units 111, 112 exhibit the admissible configuration.

In one embodiment, two or more of the at least two production units 111, 112 may be spaced apart from one another, for example.

In accordance with an embodiment, the verification module 130 may be spaced apart from, e.g., at least one of the at least two production units 111, 112.

In one embodiment, the verification module 130 may be configured to transmit, e.g. to the service module 121, 122 of each of the at least two production units 111, 112, the second information designating whether the at least two production units 111, 112 exhibit the admissible configuration or whether the at least two production units 111, 112 exhibit no admissible configuration.

In accordance with an embodiment, the service module 121, 122 of each production unit of the at least two production units 111, 112 may be configured, e.g., to insert first data into a blockchain, which data depends on the first information about the one or more features of the production unit that is transmitted to the verification module 130.

In one embodiment, the first data inserted into the blockchain by the service module 121, 122 of each production unit of the at least two production units 111, 112 may be, e.g., the first information about the one or more features of the production unit that is transmitted to the verification module 130 by the service module 121, 122 of the production unit.

In accordance with an embodiment, the service module 121, 122 of each production unit of the at least two production units 111, 112 may be configured to transmit the first information about one or more features of the production unit to the verification module 130 in that, e.g., the service module 121, 122 of the production unit inserts the first information into the blockchain.

In one embodiment, the first data inserted into the blockchain by the service module 121, 122 of each production unit of the at least two production units 111, 112 may be, e.g. at least a first hash value which depends on the first information about the one or more features of the production unit that is transmitted to the verification module 130 by the service module 121, 122 of the production unit. Within this context, the service module 121, 122 of each production unit of the at least two production units 111, 112 may be configured, e.g., to additionally transmit the first information about one or more features of the production unit to the verification module 130 without using the blockchain.

In accordance with one embodiment, the verification module 130 may be configured, e.g., to insert second data into a blockchain, which second data depends on the second information designating whether the at least two production units 111, 112 exhibit the admissible configuration or whether the at least two production units 111, 112 exhibit no admissible configuration.

In one embodiment, the second data inserted into the blockchain by the verification module 130 may be, e.g., the second information designating whether the at least two production units 111, 112 exhibit the admissible configuration or whether the at least two production units 111, 112 exhibit no admissible configuration.

In accordance with an embodiment, the verification module 130 may be configured, e.g., to transmit the second information designating whether the at least two production units 111, 112 exhibit the admissible configuration or whether the at least two production units 111, 112 exhibit no admissible configuration, to the service module 121, 122 of the at least one of the at least two production units 111, 112 in that the verification module 130 inserts said second information into blockchain.

In one embodiment, the second data inserted into the blockchain by the verification module 130 may be, e.g., at least a second hash value which depends on the second information designating whether the at least two production units 111, 112 exhibit an admissible configuration or whether the at least two production units 111, 112 exhibit no admissible configuration. Within this context, the verification module 130 may be configured, e.g., to additionally transmit the second information designating whether the at least two production units 111, 112 exhibit an admissible configuration or whether the at least two production units 111, 112 exhibit no admissible configuration, to the service module 121, 122 of the at least one of the at least two production units 111, 112 without using the blockchain.

In accordance with an embodiment, the verification module 130 may be configured, e.g., to insert third data, which interlinks the second data and the first data with one another, into the blockchain.

In one embodiment, the verification module 130 may be configured, e.g., to insert fourth data into the blockchain which serves invoicing purposes.

In accordance with an embodiment, the second information transmitted by the verification module 130 and designating whether the at least two production units 111, 112 exhibit an admissible configuration or whether the at least two production units 111, 112 exhibit no admissible configuration may, e.g., represent a digital certificate indicating, e.g., that the admissible configuration has been certified in case the at least two production units 111, 112 exhibit the admissible configuration.

In one embodiment, e.g., the service module 121, 122 of the at least one of the at least two production units 111, 112 and/or the verification module 130 may comprise an interface implemented by means of Open Platform Communication Unified Architecture.

Figure 2:
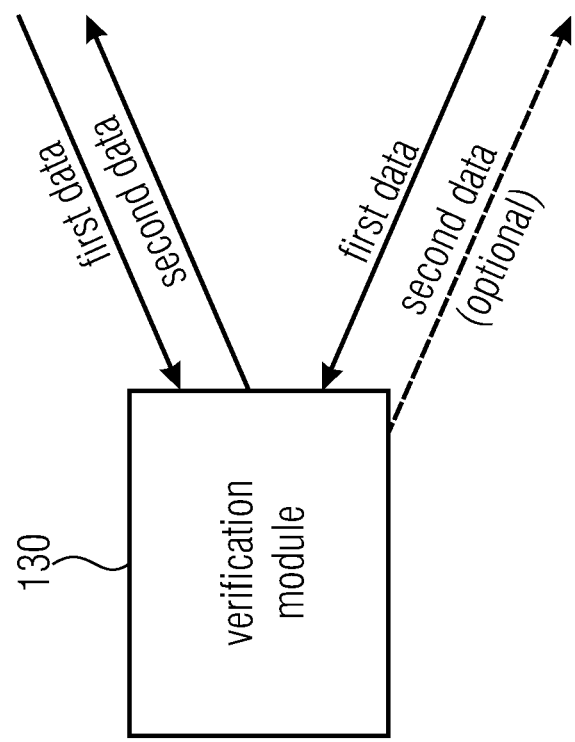
FIG. 2 shows a verification module in accordance with an embodiment.

FIG. 2 shows a verification module 130 in accordance with an embodiment.

The verification module 130 is configured to obtain first information from a service module 121, 122 of each production unit of at least two production units 111, 112; the first information, which is obtained by the verification module 130 from the service module 121, 122 of each production unit of the at least two production units 111, 112, is information about one or more features of the production unit.

In addition, the verification module 130 is configured to transmit, to the service module 121, 122 of at least one of the at least two production units 111, 112, second information designating whether the at least two production units 111, 112 exhibit an admissible configuration or whether the at least two production units 111, 112 exhibit no admissible configuration.

In an embodiment, the verification module 130 may comprise, e.g., a test algorithm which determines, as a function of the first information about the one or more features that is transmitted to the verification module 130 by the service module 121, 122 of the at least two production units, whether the at least two production units 111, 112 exhibit the admissible configuration.

In accordance with an embodiment, the verification module 130 may be spaced apart from, e.g., at least one of the at least two production units 111, 112.

In one embodiment, the verification module 130 may be configured, e.g., to transmit, to the service module 121, 122 of each of the at least two production units 111, 112, the second information designating whether the at least two production units 111, 112 exhibit the admissible configuration or whether the at least two production units 111, 112 exhibit no admissible configuration.

In accordance with one embodiment, the verification module 130 may be configured, e.g., to insert second data into a blockchain, which data depends on the second information designating whether the at least two production units 111, 112 exhibit the admissible configuration or whether the at least two production units 111, 112 exhibit no admissible configuration.

In one embodiment, the second data inserted into the blockchain by the verification module 130 may be, e.g., the second information designating whether the at least two production units 111, 112 exhibit the admissible configuration or whether the at least two production units 111, 112 exhibit no admissible configuration.

In accordance with an embodiment, the verification module 130 may be configured, e.g., to transmit the second information designating whether the at least two production units 111, 112 exhibit the admissible configuration or whether the at least two production units 111, 112 exhibit no admissible configuration, to the service module 121, 122 of the at least one of the at least two production units 111, 112 in that the verification module 130 inserts said second information into blockchain.

In one embodiment, the second data inserted into the blockchain by the verification module 130 may be, e.g., at least a second hash value which depends on the second information designating whether the at least two production units 111, 112 exhibit an admissible configuration or whether the at least two production units 111, 112 exhibit no admissible configuration. Within this context, the verification module 130 may be configured, e.g., to additionally transmit the second information designating whether the at least two production units 111, 112 exhibit an admissible configuration or whether the at least two production units 111, 112 exhibit no admissible configuration, to the service module 121, 122 of the at least one of the at least two production units 111, 112 without using the blockchain.

In accordance with one embodiment, the verification module 130 may be configured, e.g., to insert fourth data, which serves invoicing purposes, into the blockchain.

In one embodiment, the second information transmitted by the verification module 130 and designating whether the at least two production units 111, 112 exhibit an admissible configuration or whether the at least two production units 111, 112 exhibit no admissible configuration may, e.g., represent—in case the at least two production units 111, 112 exhibit the admissible configuration—a digital certificate indicating, e.g., that the admissible configuration has been certified.

In accordance with one embodiment, the verification module 130 may comprise, e.g., an interface implemented by means of Open Platform Communication Unified Architecture.

Figure 3:
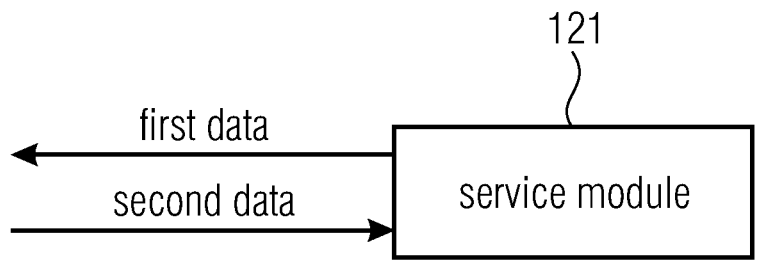
FIG. 3 shows a service module in accordance with an embodiment.

FIG. 3 shows a service module 121 in accordance with an embodiment. The service module 121 is provided as a service module for a production unit 111 of at least two production units 111, 112.

The service module 121 is configured to transmit first information about one or more features of the production unit 111 of the service module 121 to the verification module 130.

Moreover, the service module 121 is configured to receive, from a verification module 130, second information designating whether the at least two production units 111, 112 exhibit an admissible configuration or whether the at least two production units 111, 112 exhibit no admissible configuration.

In accordance with an embodiment, the service module 121 may be configured, e.g., to insert into a blockchain first data which depends on the first information about the one or more features of the production unit 111 that is transmitted to the verification module 130.

In one embodiment, the first data inserted into the blockchain by the service module 121 may be, e.g., the first information about the one or more features of the production unit 111 of the service module 121 that is transmitted to the verification module 130 by the service module 121.

In accordance with an embodiment, the service module 121 may be configured, e.g., to transmit the first information about one or more features of the production unit 111 of the service module 121 to the verification module 130 in that the service module 121 inserts the first information into the blockchain.

In one embodiment, the first data inserted into the blockchain by the service module 121 may be, e.g. at least a first hash value which depends on the first information about the one or more features of the production unit 111 of the service module 121 that is transmitted to the verification module 130 by the service module 121. Within this context, the service module 121 may be configured, e.g., to additionally transmit the first information about one or more features of the production unit 111 of the service module 121 to the verification module 130 without using the blockchain.

In accordance with an embodiment, the service module 121 may comprise, e.g., an interface implemented by means of Open Platform Communication Unified Architecture.

Figure 4:
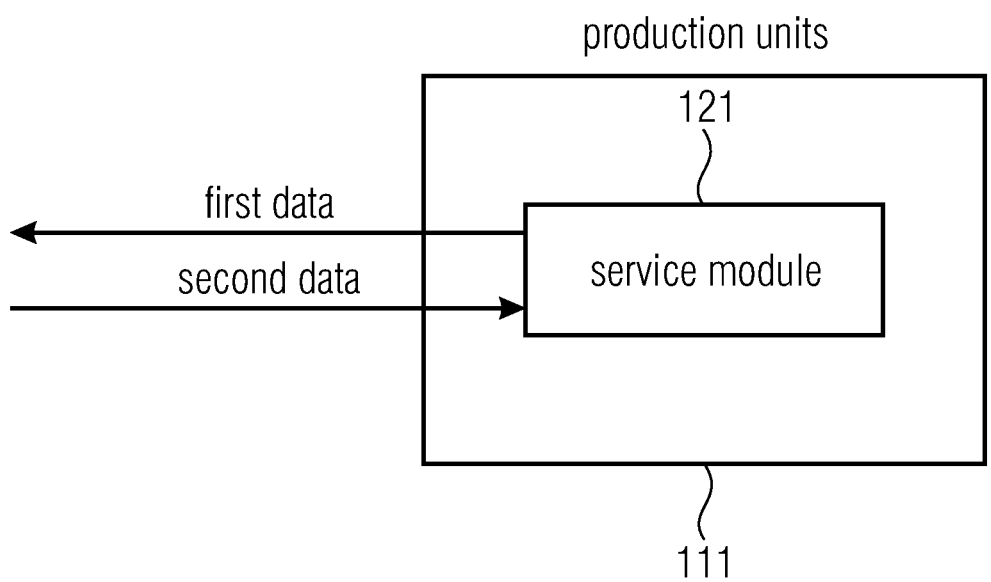
FIG. 4 shows a production unit in accordance with an embodiment, including a service module in accordance with an embodiment.

FIG. 4 shows a production unit 111 including the service module 121 of FIG. 3.

Figure 5:
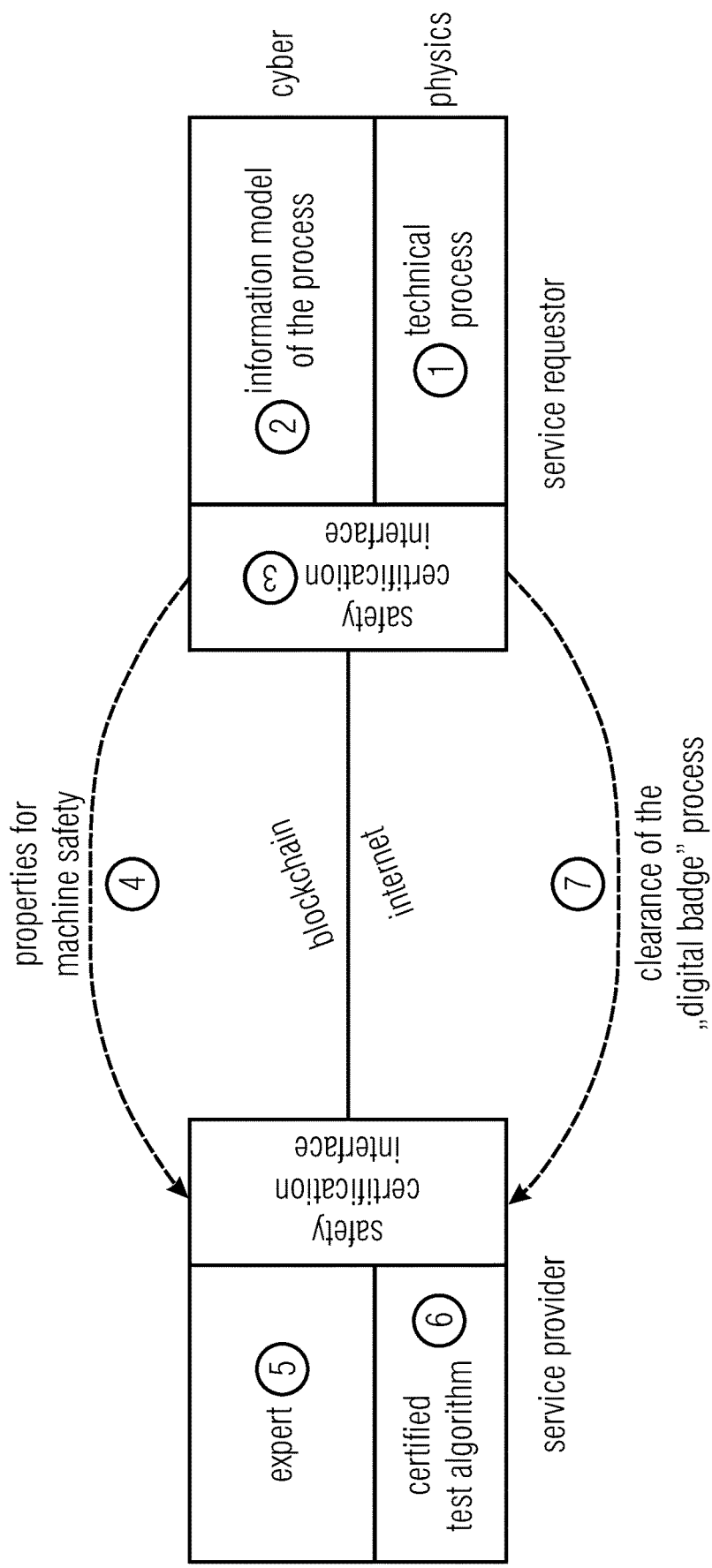
FIG. 5 shows a schematic overview of embodiments of the invention.

The mode of operation of embodiments of the invention will be described below with reference to FIG. 5. FIG. 5 shows a schematic overview of embodiments of the invention.

In embodiments, the remote certification service may connect, e.g., to each asset (e.g. a machine) in the production system and retrieve safety-relevant features for evaluation, e.g. via the internet, M2M, blockchain, OPC UA (M2M=machine to machine; OPC UA=Open Platform Communication Unified Architecture).

For example, in one embodiment, an expert may decide, via the blockchain internet, upon compliance with machine safety on the basis of the information available. Said expert may be supported by a test algorithm.

In accordance with one embodiment, e.g., the test algorithm itself may be certified by an independent auditor. From this point in time, the test algorithm may check compliance with machine safety in an automated manner, for example.

In embodiments, information that was available for the certification, decisions made by the algorithm or the expert, and the certificate itself may be documented in a legally secure manner by means of a blockchain technology.

In accordance with embodiments, automatic invoicing also may be performed, e.g., by means of the legally secure evidence of the service rendered.

The schematic overview of embodiments of the invention that is given in FIG. 5 will be explained in more detail below.

In FIG. 5, item ① shows a technical process which is continually modified/optimized (and/or re-configured) by Industry 4.0 technologies.

Moreover, item ② in FIG. 5 shows an information model (e.g. BIM, CAD data, OPC UA) which sufficiently describes the machine. (BIM=Building Information Modeling; CAD=Computer-Aided Design).

Moreover, item ③ in FIG. 5 shows that safety-relevant features are transferred to a safety certification interface which is compatible with the service provider and ensures integrity of the information.

In addition, item ④ in FIG. 5 shows that the information in the safety certification interface is transmitted/transferred/sent, in a tamper-proof manner, via the internet by means of a blockchain technology.

Furthermore, item ⑤ in FIG. 5 shows that all of the information relevant for evaluation is collected at the service provider and is evaluated by an expert. Remote certification results.

Furthermore, item ⑥ in FIG. 5 shows that a certified test algorithm may support an expert or may also perform automated evaluation. Each decision and its result are documented within the blockchain and linked to the data which, as described in item 4), has been transmitted in a tamper-proof manner.

Moreover, item ⑦ in FIG. 5 shows that the technical process may be cleared for operation via the safety certification interface. Said process obtains a so-called "digital badge". The result of said process is the (partially) automated risk assessment of a machine and is documented as such in a legally secure manner via the blockchain.

Specific examples in accordance with particular embodiments will be described below.

For example, a production system in a factory may include 20 machines. One of the 20 machines is replaced by a machine of a different type, for example. By means of the above concepts, a check is to be performed in terms of whether the production system meets certification requirements, i.e., for example, whether the 19 machines that have so far been present are allowed to be combined with the new twentieth machine in the production system.

In other examples, a production system is set up entirely from the beginning, for example, it is set up on the basis of 20 machines, and a check is to be performed as to whether the 20 machines are allowed to be combined with one another in the new production system.

In the above examples, each of the 20 machines is represented (e.g. in a simplified manner) by an information model specific to the respective machine (see item ② of FIG. 5). As was described above with reference to FIG. 5, such an information model may be based on OPC UA, BIM or also on CAD data.

Each machine may be equipped with a corresponding module which may implement a full client or a thin client of a blockchain.

In above item ④ of FIG. 5, the machines send safety-relevant features to a verification module via an interface (see item ③ in FIG. 5), for example by means of blockchain technology, which verification module will provide the information to an expert, for example (see item ⑤ in FIG. 5) or to a certified test algorithm (see item ⑥ in FIG. 5) within the verification module.

So as to document the fact that precisely the transmitted information has actually been transmitted, the information transmitted is either fully stored within the blockchain, or a hash is formed on the information transmitted, and the hash is stored in the blockchain.

To implement the blockchain technology, provision may be made, among other things, for the client of each of the machines to store a private (cryptographic) key. Instead of the private key, a password combination of, e.g., 8, 16 or 24 words may be stored on each client so as to dynamically generate the private key whenever need may be.

The integrity of the blockchain may be ensured in that a large number of subscribers from a large number of different companies implement the blockchain. A blockchain typically is deemed as being safe when there are a sufficiently large number of users of the blockchain who do not manipulate the blockchain and who provide (clearly) more than half of the computing capacity for the blockchain.

An expert (see item ⑤ in FIG. 5) or a test algorithm (see item ⑥ in FIG. 5) then evaluate the information from the, e.g., 20 machines and judge whether the new production system consisting of the 20 machines represents an admissible overall configuration.

The result of the test may be a statement saying that the current configuration of the overall system is admissible and will be certified, or is not admissible and will not be certified.

In some embodiments, the result of the test may also be a proposal for improvements which indicates modifications that may change a non-admissible configuration to an admissible configuration.

For example, the safety-critical features mentioned under item (3) of FIG. 5 may be a maximum rotational speed of a machine, a maximum operating temperature of a machine, or a maximum number of punching operations per minute. For example, the proposal for improvement that is made by the expert or the test algorithm may then consist in adjusting the maximum rotational speed of a machine that is technically possible, the maximum operating temperature of a machine, or the maximum number of punching operations per minute, that is technically possible, of a punching machine to a lower rotational speed, to a lower upper temperature limit, or to a lower maximum number of punching operations per minute.

In embodiments, the test algorithm may be set such that, e.g., a number of compatibility rules and/or incompatibility rules will be established.

Each of the compatibility rules may define, e.g., ranges of values for a safety-relevant feature, respectively, of two or more of the machines within which the respective safety-relevant feature will have to lie when the two or more machines are employed together (compatibility rule) (for example: the maximum operating temperature of machine 1 is between 5° C. and 60° C., the maximum rotational speed of machine 2 is between 0 and 500 revolutions per minute). If any of the safety-relevant features exhibits a value not lying within the admissible range, an inadmissible overall configuration may be concluded. However, if all of the safety-relevant features of all rules lie within their respective admissible ranges, an admissible overall configuration may be concluded.

Each of the incompatibility rules may define, e.g., ranges of values for a safety-relevant feature, respectively, of two or more of the machines within which the respective safety-relevant feature is not allowed to lie when the two or more machines are employed together (incompatibility rule) (for example: the maximum operating temperature of machine machine 3 is larger than 70° C., the maximum number of punching operations per minute of machine 4 is larger than 20 punching operations per minute). If any of the safety-relevant features of an incompatibility rule exhibits a value lying within the inadmissible range, an inadmissible overall configuration may be concluded. However, if no safety-relevant features of no rules lie within their respective inadmissible ranges, an admissible overall configuration may be concluded.

In some embodiments, both compatibility rules and incompatibility rules are present and are tested.

Further examples of safety-relevant features in accordance with some embodiments may be, e.g., the material that is to be admissibly processed and/or the parts and/or products that are to be admissibly processed.

A further example of a safety-relevant feature in accordance with an embodiment may be, e.g., a freedom of movement of a robot and/or manipulator, e.g. the admissible range of values of the yaw angle and/or, e.g., the admissible range of values of the pitch angle, and/or, e.g., the admissible range of values of the roll angle.

If it is established that there is an admissible overall configuration, the technical process will be cleared for operation via the safety certification interface, as described in item 7 of FIG. 5. Each of the 20 machines may obtain corresponding information from the verification module by means of the blockchain. Said digital certification, or a hash thereof, will then be stored within the blockchain, for example, said information being linked, within the blockchain, to the associated safety-relevant features stored within the blockchain or to their associated hash values stored within the blockchain.

The cleared processes/the cleared overall configuration thus obtains a so-called "digital badge", which is documented in a reliable, e.g. legally secure, manner via the blockchain.

Figure 6:
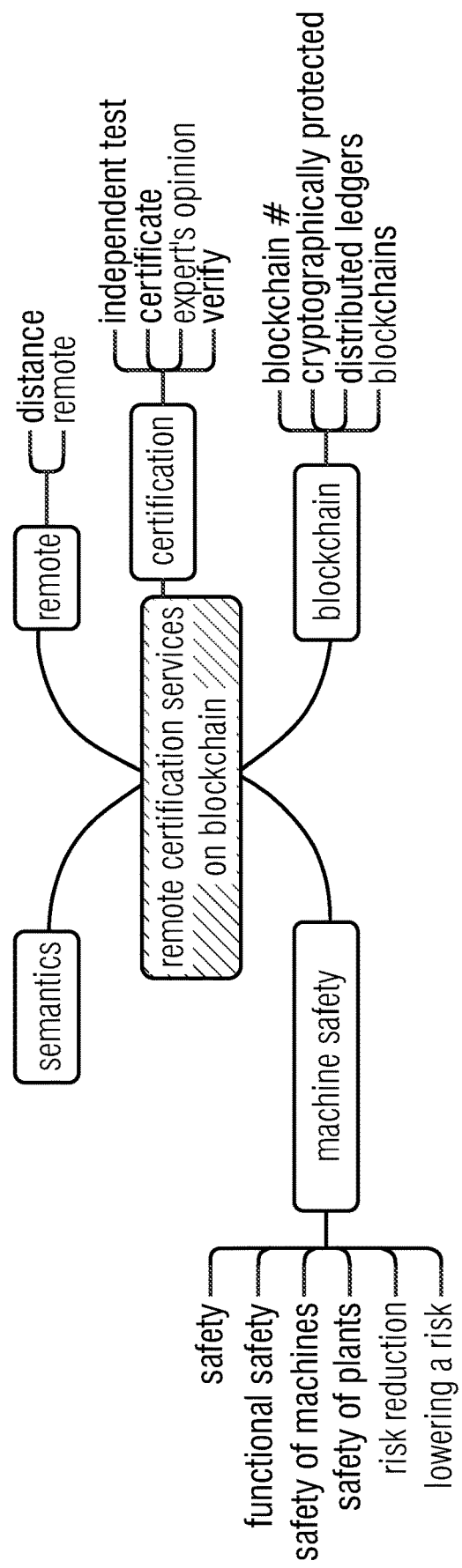
FIG. 6 shows the relationship of terms used and provides examples and properties related to terms used.

FIG. 6 shows the relationship of terms used and provides examples and properties related to terms used.

Concepts of some of the embodiments will be presented below.

For example, in accordance with one embodiment, a remote certification service for machine safety, in particular for functional safety, is provided.

In one embodiment, the remote certification service is protected in a tamper-proof and legally secure manner by means of blockchain.

In accordance with an embodiment, machine-processable information is used (e.g. while using specific semantics).

In one embodiment, interfaces having safety profiles are provided (e.g. OPC UA).

In accordance with one embodiment, concepts for invoicing the service via blockchain are provided.

In one embodiment, (e.g. certified) test algorithms test machine safety (risk assessment).

In embodiments relating to machine safety, it is possible, e.g., to start by performing a risk analysis of the machines, which is then followed by a risk assessment, for example. In some embodiments, risk-reducing measures may then possibly be suggested. In some embodiments, a digital certificate issued, e.g., by an audit service (e.g. the German Technical Inspection Association Technischer Überwachungsverein TÜV®) may finally certify the safety of the machine/the safety of the machine configuration/the safety of the totality of the machines).

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device) such as a microprocessor, a programmable computer or an electronic circuit, for example.

In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium or the computer-readable medium are typically concrete and/or non-transitory and/or non-transient.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein.

Generally, the methods are performed, in some embodiments, by any hardware device. Said hardware device may be any universally applicable hardware such as a computer processor (CPU) or a graphics card (GPU), or may be a hardware specific to the method, such as an ASIC.

The devices described herein may be implemented, e.g., while using a hardware apparatus or while using a computer or while using a combination of a hardware apparatus and a computer.

The devices described herein or any components of the devices described herein may be implemented, at least partly, in hardware or in software (computer program).

The methods described herein may be implemented, e.g., while using a hardware apparatus or while using a computer or while using a combination of a hardware apparatus and a computer.

The methods described herein or any components of the devices described herein may be executed, at least partly, by hardware or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A system comprising:
    at least two production units, and
    a verification module,
    wherein each production unit of the at least two production units comprises a service module,
    wherein the service module of each production unit of the at least two production units is configured to transmit first information about one or more features of said production unit to the verification module,
    wherein the at least two production units interact in a production process, wherein the verification module is configured to transmit, to the service module of at least one of the at least two production units, second information designating whether the at least two production units exhibit an admissible configuration or whether the at least two production units exhibit no admissible configuration.

2. The system as claimed in claim 1,
    wherein the verification module comprises a test algorithm which determines, as a function of the first information about the one or more features that is transmitted to the verification module by the at least two production units, whether the at least two production units exhibit the admissible configuration.

3. The system as claimed in claim 1, wherein two or more of the at least two production units are spaced apart from one another.

4. The system as claimed in claim 1, wherein the verification module is spaced apart from at least one of the at least two production units.

5. The system as claimed in claim 1,
    wherein the verification module is configured to transmit, to the service module of each of the at least two production units, the second information designating whether the at least two production units exhibit no admissible configuration.

6. The system as claimed in claim 1,
    wherein the service module of each production unit of the at least two production units is configured to insert first data into a blockchain, said first data depending on the first information about the one or more features of said production unit that is transmitted to the verification module.

7. The system as claimed in claim 6,
    wherein the first data inserted into the blockchain by the service module of each production unit of the at least two production units is the first information about the one or more features of said production unit that is transmitted to the verification module by the service module of said production unit.

8. The system as claimed in claim 7,
    wherein the service module of each production unit of the at least two production units is configured to transmit the first information about one or more features of said production unit to the verification module in that the service module of said production unit inserts the first information into the blockchain.

9. The system as claimed in claim 6,
    wherein the first data inserted into the blockchain by the service module of each production unit of the at least two production units is at least a first hash value which depends on the first information about the one or more features of said production unit that is transmitted to the verification module by the service module of said production unit,
    wherein the service module of each production unit of the at least two production units is configured to additionally transmit the first information about one or more features of said production unit to the verification module without using the blockchain.

10. The system as claimed in claim 1,
    wherein the verification module is configured to insert second data into a blockchain, said second data depending on the second information designating whether the at least two production units exhibit the admissible configuration or whether the at least two production units exhibit no admissible configuration.

11. The system as claimed in claim 10,
    wherein the second data inserted into the blockchain by the verification module is the second information designating whether the at least two production units exhibit the admissible configuration or whether the at least two production units exhibit no admissible configuration.

12. The system as claimed in claim 1,
    wherein the verification module is configured to transmit the second information, which designates whether the at least two production units exhibit an admissible configuration or whether the at least two production units exhibit no admissible configuration, to the service module of the at least one of the at least two production units in that the verification module inserts said second information into the blockchain.

13. The system as claimed in claim 11,
    wherein the second data inserted into the blockchain by the verification module is at least a second hash value which depends on the second information designating whether the at least two production units exhibit an admissible configuration or whether the at least two production units exhibit no admissible configuration, wherein the verification module is configured to transmit the second information, which designates whether the at least two production units exhibit an admissible configuration or whether the at least two production units exhibit no admissible configuration, to the service module of the at least one of the at least two production units without using the blockchain.

14. The system as claimed in claim 1, wherein the verification module is configured to insert third data, which interlinks the second data and the first data to one another, into the blockchain.

15. The system as claimed in claim 6, wherein the verification module is configured to insert fourth data, which is to aid invoicing, into the blockchain.

16. The system as claimed in claim 1,
wherein the second information transmitted by the verification module and designating whether the at least two production units exhibit the admissible configuration or whether the at least two production units exhibit no admissible configuration represents—in case the at least two production units exhibit the admissible configuration—a digital certificate indicating that said admissible configuration is certified.

17. The system as claimed in claim 1, wherein the service module of one or more of the at least two production units and/or the verification module comprise(s) an interface implemented by means of Open Platform Communication Unified Architecture.

18. A method comprising:
transmitting first information by a service module of each production unit of at least two production units to a verification module, said first information transmitted by the service module of said production unit being information about one or more features of said production unit, wherein the at least two production units interact in a production process, and
transmitting second information to the service module of at least one of the at least two production units by the verification module, said second information designating whether the at least two production units exhibit an admissible configuration or whether the at least two production units exhibit no admissible configuration.

19. A non-transitory computer-readable medium comprising a computer program comprising a program code for performing a method comprising
transmitting first information by a service module of each production unit of at least two production units to a verification module, said first information transmitted by the service module of said production unit being information about one or more features of said production unit, wherein the at least two production units interact in a production process, and
transmitting second information to the service module of at least one of the at least two production units by the verification module, said second information designating whether the at least two production units exhibit an admissible configuration or whether the at least two production units exhibit no admissible configuration,
when the computer program is executed on a computer or signal processor.

20. An apparatus implementing a verification module, said verification module being configured to gather first information from a service module of each production unit of at least two production units, said first information gathered by the verification module from the service module of each production unit of the at least two production units being information about one or more features of said production unit, wherein the at least two production units interact in a production process,
said verification module being configured to transmit, to the service module of at least one of the at least two production units, second information designating whether the at least two production units exhibit an admissible configuration or whether the at least two production units exhibit no admissible configuration.

21. The apparatus as claimed in claim 20,
wherein the verification module comprises a test algorithm which determines, as a function of the first information about the one or more features that is transmitted to the verification module by the at least two production units, whether the at least two production units exhibit the admissible configuration.

22. The apparatus as claimed in claim 20,
wherein the verification module is spaced apart from at least one of the at least two production units.

23. The apparatus as claimed in claim 20,
wherein the verification module is configured to transmit, to the service module of each of the at least two production units, the second information designating whether the at least two production units exhibit no admissible configuration.

24. The apparatus as claimed in claim 20,
wherein the verification module is configured to insert second data into a blockchain, said second data depending on the second information designating whether the at least two production units exhibit the admissible configuration or whether the at least two production units exhibit no admissible configuration.

25. The apparatus as claimed in claim 24,
wherein the second data inserted into the blockchain by the verification module is the second information designating whether the at least two production units exhibit the admissible configuration or whether the at least two production units exhibit no admissible configuration.

26. The apparatus as claimed in claim 25,
wherein the verification module is configured to transmit the second information, which designates whether the at least two production units exhibit an admissible configuration or whether the at least two production units exhibit no admissible configuration, to the service module of the at least one of the at least two production units in that the verification module inserts said second information into the blockchain.

27. The apparatus as claimed in claim 25,
wherein the second data inserted into the blockchain by the verification module is at least a second hash value which depends on the second information designating whether the at least two production units exhibit an admissible configuration or whether the at least two production units exhibit no admissible configuration,
wherein the verification module is configured to additionally transmit the second information, which designates whether the at least two production units exhibit an admissible configuration or whether the at least two production units exhibit no admissible configuration, to the service module of the at least one of the at least two production units without using the blockchain.

28. The apparatus as claimed in claim 20,
the verification module being configured to insert fourth data, which is to aid invoicing, into the blockchain.

29. The apparatus as claimed in claim 20,
wherein the second information transmitted by the verification module and designating whether the at least two production units exhibit the admissible configuration or whether the at least two production units exhibit no admissible configuration represents—in case the at least two production units exhibit the admissible configuration—a digital certificate indicating that said admissible configuration is certified.

30. The apparatus as claimed in claim 20,
wherein the verification module comprises an interface implemented by means of Open Platform Communication Unified Architecture.

31. A method comprising:
receiving, on part of a verification module, first information from a service module of each production unit of at least two production units, said first information transmitted by the service module of said production unit being information about one or more features of said production unit, wherein the at least two production units interact in a production process, and
transmitting second information to the service module of at least one of the at least two production units by the verification module, said second information designating whether the at least two production units exhibit an admissible configuration or whether the at least two production units exhibit no admissible configuration.

32. A non-transitory computer-readable medium comprising a computer program comprising a program code for performing a method comprising
receiving, on part of a verification module, first information from a service module of each production unit of at least two production units, said first information transmitted by the service module of said production unit being information about one or more features of said production unit, wherein the at least two production units interact in a production process, and
transmitting second information to the service module of at least one of the at least two production units by the verification module, said second information designating whether the at least two production units exhibit an admissible configuration or whether the at least two production units exhibit no admissible configuration,
when the computer program is executed on a computer or signal processor.

33. An apparatus implementing a service module for a production unit of at least two production units, wherein the at least two production units interact in a production process,
the service module being configured to transmit first information about one or more features of the production unit of the service module to a verification module,
the service module being configured to receive, from a verification module, second information designating whether the at least two production units exhibit an admissible configuration or whether the at least two production units exhibit no admissible configuration.

34. The apparatus as claimed in claim 33,
the service module being configured to insert, into a blockchain, first data which depends on the first information about the one or more features of the production unit that is transmitted to the verification module.

35. The apparatus as claimed in claim 34,
wherein the first data inserted into the blockchain by the service module is the first information about the one or more features of the production unit of the service module that is transmitted to the verification module by the service module.

36. The apparatus as claimed in claim 35,
the service module being configured to transmit the first information about one or more features of the production unit of the service module to the verification module in that the service module inserts the first information into the blockchain.

37. The apparatus as claimed in claim 34,
wherein the first data inserted into the blockchain by the service module is at least a first hash value which depends on the first information about the one or more features of the production unit of the service module that is transmitted to the verification module by the service module,
the service module being configured to additionally transmit the first information about one or more features of the production unit of the service module to the verification module without using the blockchain; or
service module for a production unit of at least two production units,
the service module being configured to transmit first information about one or more features of the production unit of the service module to the verification module,
the service module being configured to receive, from a verification module, second information designating whether the at least two production units exhibit an admissible configuration or whether the at least two production units exhibit no admissible configuration,
the service module comprising an interface implemented by means of Open Platform Communication Unified Architecture.

38. An apparatus implementing a production unit comprising a service module for a production unit of at least two production units, wherein the at least two production units interact in a production process, the service module being configured to transmit first information about one or more features of the production unit of the service module to a verification module, the service module being configured to receive, from a verification module, second information designating whether the at least two production units exhibit an admissible configuration or whether the at least two production units exhibit no admissible configuration.

39. A method comprising:
transmitting first information to a verification module by a service module of a production unit of at least two production units, said first information transmitted by the service module of said production unit being information about one or more features of said production unit of the service module, wherein the at least two production units interact in a production process, and
receiving second information from the verification module on part of the service module, said second information designating whether the at least two production units exhibit an admissible configuration or whether the at least two production units exhibit no admissible configuration.

40. A non-transitory computer-readable medium comprising a computer program comprising a program code for performing a method comprising
transmitting first information to a verification module by a service module of a production unit of at least two production units, said first information transmitted by the service module of said production unit being information about one or more features of said production unit of the service module, wherein the at least two production units interact in a production process, and
receiving second information from the verification module on part of the service module, said second information designating whether the at least two production units exhibit an admissible configuration or whether the at least two production units exhibit no admissible configuration, when the computer program is executed on a computer or signal processor.

* * * * *